Aug. 2, 1966 J. RISEMAN ET AL 3,264,619

CYLINDRICAL FILM METAL CORES

Filed May 25, 1962 3 Sheets-Sheet 1

INVENTORS
JACOB RISEMAN
QUINTON W. SIMKINS
BARRY L. FLUR
BY George O. Saile
ATTORNEY

CYLINDRICAL FILM METAL CORES

Filed May 25, 1962 3 Sheets-Sheet 3

3,264,619

CYLINDRICAL FILM METAL CORES

Jacob Riseman, Quinton W. Simkins, and Barry L. Flur, Poughkeepsie, N.Y., assignors to International Business Machines Corporation, New York, N.Y., a corporation of New York Filed May 25, 1962, Ser. No. 197,707
9 Claims. (Cl. 340—174)

The present invention relates to a bistable closed flux magnetic core and to a process for the fabrication of such metal cores.

The increasing demand for faster and more reliable computers has directed present day interests to solid state electronic components. The most significant result of this work is the development of the ferrite core with its square loop characteristics so uniform and reliable that computers employing more than a million cores perform reliably.

The development of thin magnetic film devices for use as storage elements in a digital computer has been under considerable study. Much of the motivation for the study of thin magnetic films has been the desire to improve the speed-to-power relation of present ferrite core memories. The speed of the memories has so far been limited by the speed with which the magnetization can be reversed between the two stable states representing the information 1 and 0.

It is known that thin magnetic films may be deposited on suitable substrates by such well known techniques as evaporation in a high vacuum, by electroplating or sputtering. The preparation of evaporated metallic films, however, has been given a great deal more attention by investigators than either of the other two mentioned fabrication techniques. Additionally, almost exclusive effort has been given to the depositing of the magnetic layers on flat substrates. Further, the main theme of the fabricator's efforts has been to, in one depositing step, make a magnetic film which is capable of storing a great number of bits of information.

A major problem of thin magnetic film memories lies in their preparation. The technique for producing homogenous and reproducible thin bistable magnetic elements in quantity has completely eluded all investigators until the present time. In spite of the many difficulties encountered, there have been experimental thin magnetic film memories built and tested. Such memories are on a very small scale. The investigators, until the present invention, have completely failed in their efforts to reproduce in thin magnetic film core memories the reliability of the present day ferrite core memories.

It is thus an object of the present invention to provide an individual closed flux bistable magnetic core which has a substantially lower switching constant than the present day ferrite cores and may be fabricated in large quantities with reproducible characteristics.

It is another object of this invention to provide an individual closed flux bistable magnetic core capable of being used in orthogonal mode, high speed switching circuits.

Further, it is an object of this invention to provide a bistable magnetic core having optimum properties and directly replaceable into the circuits presently using the ferrite cores.

It is a still further object of the present invention to provide a process for the fabrication of bistable magnetic cores which is effective to produce large quantities of the cores within close tolerances and of high reliability.

These and other objects are accomplished in accordance with the broad aspects of the present invention by providing a novel closed flux bistable magnetic core structure. The bistable magnetic core is cylindrical and short in height. A hollow cylindrical siliceous body is the substrate upon which is built, under carefully controlled conditions and thicknesses, layers of metals having particular properties. A layer of a noble metal is first deposited over the external surface of the siliceous substrate. Then a layer of a nickel-iron alloy is deposited over the noble metal. The nickel-iron alloy layer must have at least a substantially circumferentially magnetic crystal orientation. The layers are necessarily very thin and of the order that they are conveniently measured in Angstrom units. This precise geometrical combination of metals on the short, hollow cylindrical substrate produces a bistable magnetic core substantially equal in reliability and greatly faster in switching properties than the present day ferrite cores.

The bistable magnetic cores of the invention are preferably made by basically a combination of vacuum evaporation, electroplating and cutting techniques. A suitable clean and dry, long cylindrical siliceous substrate is positioned in the vacuum chamber of a vacuum evaporation unit and a layer of a noble metal is evenly condensed over the external surface of the substrate. The substrate with the evaporated layer of a noble metal is placed in a suitable electrolyte containing nickel and iron ions. The noble metal is made the cathode of the cell and a nickel-iron alloy layer deposited over the noble metal. The plated cylindrical article is then embedded in a plastic molding composition and after solidification of the composition, it is cut along a plane perpendicular to the longitudinal axis of the cylindrical article. The molding composition is removed from the piece to give the closed flux bistable magnetic cores of the present invention.

The foregoing and other objects, features and advantages of the invention will be apparent from the following more particular description of the preferred embodiments of the invention, as illustrated in the accompanying drawings.

There are two basic modes of utilizing the closed flux bistable magnetic cores or storage elements of the present invention. These modes are most descriptively termed the parallel and orthogonal modes of operation. In each mode, the storage elements are arranged in a coordinate array as is conventional in the information handling arts. Wherein, it is possible to individually alter the magnetic state of any selected core in the storage coordinate matrix by coincidentally energizing a single row winding and a single column winding which intersect at that core. These windings in the case of the parallel mode operation are made to set up parallel drive fields when energized. Alternately, in the orthogonal mode operation the windings are in a configuration such as to give two drive fields at right angles to one another.

Parallel mode operation is the mode that has been conventionally used with toroidal ferrite cores. Storage systems of this type for storing binary information are taught by W. D. Winger et al. in U.S. Patent No. 2,960,-683 for a three-dimensional magnetic memory system and by J. A. Weidenhammer in U.S. Patent No. 2,708,267 for a two-dimensional memory system.

Figure 1:
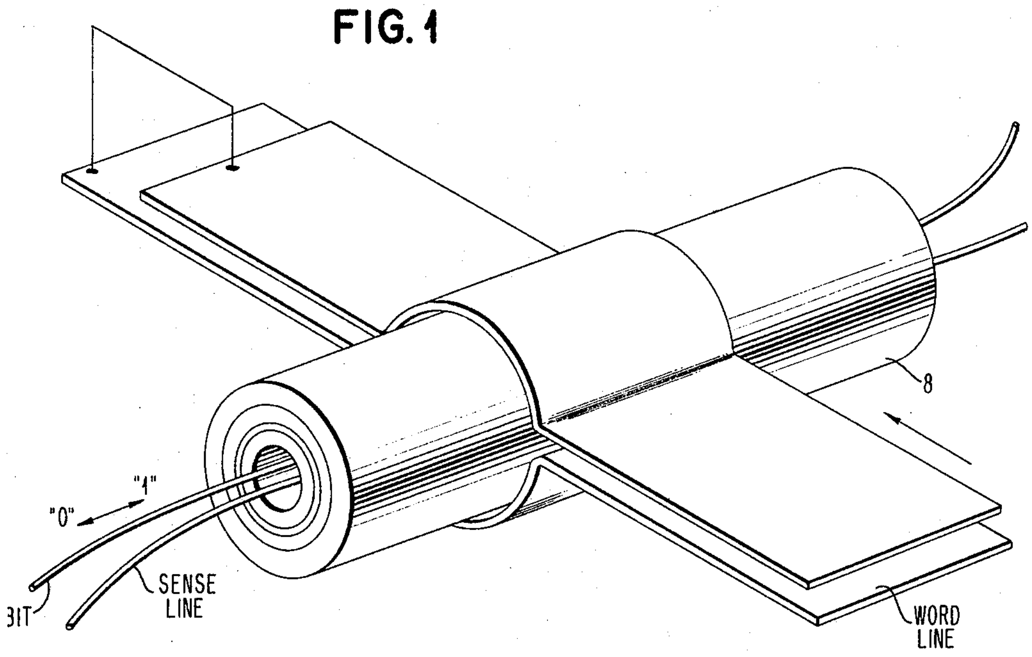
FIGURE 1 is a perspective view of the structure required for storing a single binary bit of information when the bistable magnetic core of the invention is used in the orthogonal mode.

FIGURE 1 illustrates the structure used to store a single binary bit using the orthogonal mode. The closed flux circumferentially oriented magnetic core is threaded by two wires, a sense line and a bit line. Wrapped closely about the exterior of the cylinder, and at right angles to its axis, are the two halves of a word line which form a loop about the cylinder.

The axis of magnetism for the orthogonal mode bistable core is cylindrical, because of the original orientation and because the flux path is closed. The hard axis is axial to the core at right angles to the word line. A current through the word line drives the core to the hard direction of magnetism where it is slightly unstable. The core seeks one or the other of the two easy directions of magnetism naturally. The polarity of a current through the bit line at this time provides full control of the choice of the 1 easy direction or the 0 easy direction.

Figure 2:
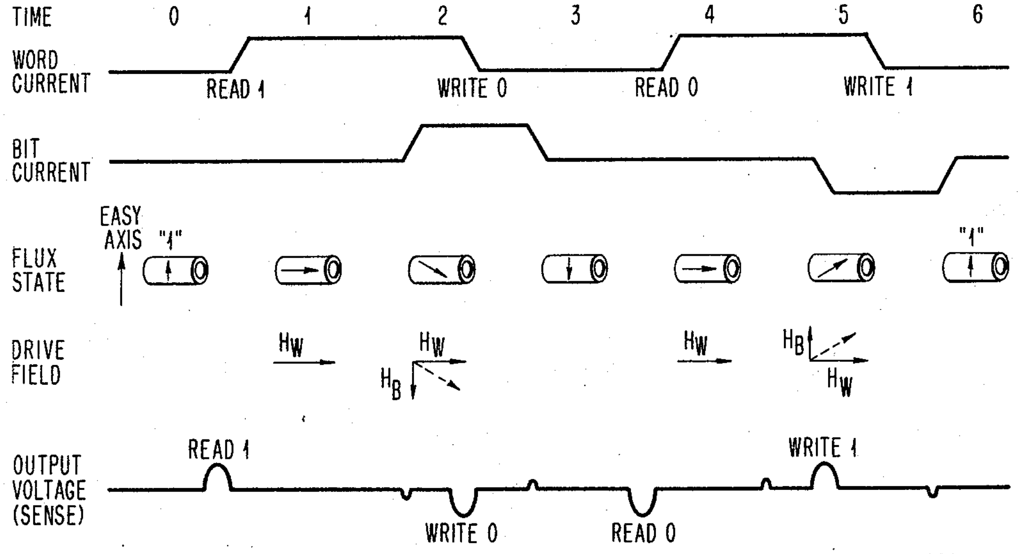
FIGURE 2 is a schematic illustration indicating the general reading and writing operations when the bistable magnetic core of the invention is used in the orthogonal mode.

The writing and reading operations for the orthogonal mode are illustrated in FIGURE 2. At time 0, the core is indicated at a "1" state. The vertical arrow indicating flux state is parallel to the easy direction of magnetization. A word current is applied through the core at time 1 which causes the flux state to change as shown. The drive field $H_w$ is at right angles to the easy direction. The change in flux causes an output in the sense line, and a "Read 1" is completed. While the word current remains applied, a bit current pulse is applied. This bit current causes a field $H_b$ parallel to the easy axis of the core. At time 2, then, there are two drive fields present, i.e., $H_b$ and $H_w$. The drive fields cause the magnetic orientation of the cylinder to shift towards the 0 direction. Upon removal of the word current, a flux state shifts to the 0 state and an output pulse results. The effect of the operation upon the magnetic core is to leave it in a 0 state after this "Write 0." The "Read 0" operation begins upon application of another word current pulse. The flux state of the cylinder is changed by the drive field $H_w$ at time 4. The rotation of the flux is reversed from that at time 1. The resulting output pulse indicates a 0 has been read. This pulse is of opposite polarity to that of a 1 which was read at time 1. At time 5, while the word current is still applied, a negative bit current is additionally applied. The two drive fields, $H_b$ and $H_w$, cause the magnetic orientation of the core to shift toward the 1 direction. Upon removal of the word current, the flux state shifts at time 6 to the 1 state which is nearest the easy axis direction. The core is again in the 1 state after this "Write 1" operation.

Figure 3:
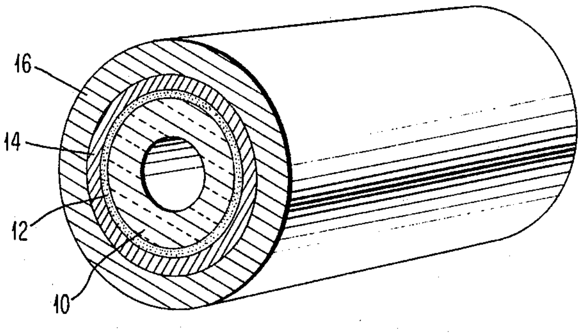
FIGURE 3 is a perspective sectional view of a bistable magnetic core made by the present invention.

Referring now, more particularly, to FIGURE 3, there is shown the bistable magnetic core of the present invention which is useful as a direct substitute for ferrite cores in the parallel mode or as a storage element in the orthogonal mode operation. The magnetic core illustrated is composed of a short, hollow cylindrical siliceous substrate 10 preferably of glass; a conductive metallic layer 14 of preferably gold; and an electroplated ferromagnetic, at least substantially circumferentially oriented, alloy layer 16. Where gold is used as the conductive metal, it is preferable to use an adhesive metallic layer 12 of chromium or its equivalent between the glass substrate and the gold conductive layer. The adherence of the gold layer to chromium is substantially superior to its adherence to glass. The substrate is of very small diameter. Inside diameter (I.D.) to outside diameter (O.D.) sizes of 20–30, 25–30, 20–25 and 15–20 mils have been used and even smaller diameters are possible. The height of the magnetic storage element is very small and is preferably 100 mils or less.

To obtain the desired bistable magnetic core characteristics and properties, the process must be carefully controlled and the thicknesses of the various layers over the siliceous substrate are important. The thicknesses of the layers and orientation of the ferromagnetic layer are for optimum results subtly different as between the bistable core to be used in the orthogonal and the parallel modes. The surface condition of the siliceous tube substrate prior to electroplating is of great importance. A compromise is therefore effected between the conductive underlayer thickness and the desire to use a thick underlayer to minimize current density, and, therefore, composition and ferromagnetic film thickness along the length of the tube. The conductive layer adhesion to the siliceous substrate is particularly important.

The conductive layer and the adhesive layer, where used, are first applied by vacuum evaporation procedures. A siliceous material tube of substantial length is thoroughly cleaned, dried and then placed in a vacuum evaporation chamber. A coating of a metal or metal alloy of such materials as chromium, titanium or an alloy of nickel and chromium having a thickness of approximately 50 to 100 angstrom units is first condensed upon the external surface of the substrate surface. Without breaking vacuum, a layer of conductive metal is then evaporated over the just deposited metal layer. The thickness of the conductive layer is within the range of 50 to 300 angstrom units for the parallel mode core. The orthogonal mode core requires a noble metal, such as gold or platinum, vacuum deposit of less than 5,000 angstrom units in thickness but preferably between 500 and 1500 angstrom units.

The parallel mode core requires the critically thin conductive underlayer because it has been found that when the underlayer is thicker than approximately 300 angstrom units, (1) the D.C. and 100 nanosecond pulse thresholds of the magnetic cores are very high, and (2) the rise time of the characteristic "S-curve" of the cores is slowed greatly. The characteristic "S-curves," shown in FIGURES 5A and B, of a typical magnetic core having a 100–200 angstrom unit conductive underlayer are completely acceptable in the magnitudes of the thresholds and rise time.

Figure 4:
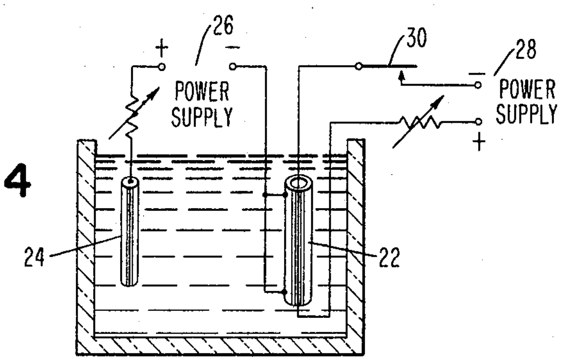
FIGURE 4 is a diagrammatic view of the electroplating set-up of the present invention.

The conductive surface is now prepared for the electroplating procedure of the invention. FIGURE 4 shows schematically the electrical set-up for electroplating. The electrolyte 20 includes at least one salt of the ferromagnetic metal to be plated in solution. The substrate having the conductive layer thereover has its ends closed with silver metal and then introduced into the electrolyte. The conductive layer is made the cathode 22 of the electrolytic cell. A suitable anode 24 is introduced as the anode of the cell. The anode and the cathode are connected respectively to the plus and minus terminals of a first power supply 26. The cathode is connected at both ends of the conductive layer to the negative terminal of the power supply 26 to improve the evenness of the electrodeposit. Means are provided to apply a circumferential orienting field during the electroplating around the conductive substrate 22. One such means is shown in FIGURE 4 as an electrical conductor through the center of the cylinder and connected to a second power supply 28. A switch 30 is provided for turning the orienting current on and off.

The electrolytic bath may be one of various known compositions. The principal types for electrodepositing ferromagnetic material in the art being the sulfate, sulfamate, chloride and a combination of sulfate and chloride baths. The names of the electrolytic baths are taken from the name of the metal salt used to provide the required ferromagnetic ions to the bath.

The preferred bath, however, is the aqueous chloride bath wherein the ferromagnetic ions, such as $Ni^{++}$ and $Fe^{++}$, are brought into solution by means of nickel and iron chlorides. The other constituents of the bath include a buffer, an inorganic chloride, a wetting agent and a stress reducing material. Boric acid is the preferred buffer. The inorganic chloride, which may be for example a sodium or potassium chloride, favors dissolving of the anode in the case of soluble anodes and increases the conductivity of the bath. An example of the wetting agent is sodium lauryl sulfate and is used to decrease the adhesion of the hydrogen bubbles on the cathode surface. The stress reducing agent is preferably saccharin. Saccharin reduces the stresses in the electrodeposit by a large percentage.

The bath composition and the electrolyzing current density have substantial influences upon the iron content of the ferromagnetic deposit. Where the ferromagnetic deposit is to be a nickel-iron alloy, as an example, the iron content in the electrodeposit would increase where either the current density or the bath concentration of the $Fe^{++}$ increased. The adjustment of the current density, however, is the preferred method of varying the alloy composition.

Electroplating is initiated by passing a current between the cathode 22 and the anode 24. The circumferential orienting field is applied during the electroplating period by closing switch 30 and allowing current to pass into the conductor strung through the cylinder to be electroplated.

The principal differences between the orthogonal mode and the parallel mode bistable magnetic cores, that is, outside of the subtle distinctions between thicknesses of the various layers, is that of the orientation of the ferromagnetic layer. In the case of the orthogonal mode core absolute circumferential magnetic orientation is required for optimum results in the electroplated ferromagnetic layer. During the entire electroplating period, a circumferential orienting field is applied to produce the required orientation. However, for parallel mode operation it has been determined that an absolute circumferential orientation is not the optimum orientation. A slightly skewed circumferential orientation is optimum for parallel mode operation.

One procedure for obtaining the slightly skewed orientation is to apply the circumferential orienting field during only 60 to 95% of the electroplating period. The orienting field is left off during preferably either the first portion or the last portion of the electroplating period. It is not fully known what orientation occurs in the electrodeposit during the time that the orienting field is off and within the changeover from no positive orienting field to a circumferential field. It is certain, however, that the orientation during this period when the orienting field is left off is other than circumferential. It might be postulated then that the overall orienting of the electrodeposit is slightly skewed from the circumferential orientation. Nevertheless, the magnetic core produced by the novel procedure of the present invention is substantially superior in switching properties to that of the magnetic core fabricated with a circumferential orienting field throughout the electroplating period when the core is used in a parallel mode array.

A permalloy film of approximately 75 to 82% nickel and the remaining percentage iron is the preferred ferromagnetic film. The film is deposited to a thickness preferably between 11,000 and 15,000 angstrom units for the parallel mode core and to preferably between 3,000 and 12,000 angstrom units for the orthogonal mode. The diameter of the cylindrical substrate requires adjustment of the plating current to produce the desired film thickness and composition.

Following the electroplating procedure, the plated article may be subjected to various tests to insure operativeness and uniformity between electroplated articles. The acceptable articles are then arranged in columns, each article with its axis parallel to the axes of the others, and a suitable encapsulating compound is molded around them to form a solid block of embedded elongated articles. Once the encapsulating compound has firmly set, the articles are sliced into magnetic cores of approximately 100 mils or less in height by a suitable cutting wheel. The encapsulating material is removed and the magnetic cores can then be tested to specification. In this manner, the problem of obtaining uniformity and reliability in a memory unit containing a large number of storage areas is relieved. The magnetic core portions of the electroplated articles that are out of specification, for one reason or another, are simply thrown away. In the case of a memory unit where one storage area is out of specification, the whole unit must be discarded.

Bistable closed flux magnetic cores for parallel mode operation using glass tubing of 20–25 mil I.D.-O.D. and 20 mil height according to the following specification are readily obtainable.

Read Current, $I_r$=700 ma.±10%
Word Current, $I_r$=250 ma.±10%
Bit Current, $I_b$=140 ma.±10%.
Bias Current, $I_c$=47.5 ma.±5%
Read Disturbs=60 ma.
Read "0," $dV_z$=6 mv.
Read "1," $dV_1$=20 mv.
Coercivity=0.5 oersted
Switch Constants=.02–.03 oersted microsec.
Pulse width, $T_d$=75 nanosec.
Pulse width, $T_d$=100 nanosec.
Pulse width, $T_d$=125 nanosec.
Pulse width, $T_o$=100 nanosec.
Time constant=30 nanosec.
Time to switch $T_s$=45–60 nanosec.

Magnetic cores have been obtained from the procedure of the present invention that have a read disturbed "1" of 37 millivolts and a read disturbed "0" of 4 millivolts. Switch constant values have been obtained as low as 0.007 oersted microseconds.

Bistable closed flux magnetic cores for orthogonal mode operation using glass tubing of 15–25 mil I.D.-O.D. and 100 mil height according to the following specifications are readily obtainable for a rise time, $T_R$, of 20 nanoseconds.

Word Current, $I_r$=800 ma.
Bit Current, $I_b$=225 ma.
Switching time=10–20 nanosec.
Switch constant=.01 oersted microsec.
Sense output=±10 mv.

The switching time and sense output are directly dependent upon the rise time, $T_R$, and will increase with shorter rise times.

The following are examples of the present invention in detail. The examples are included merely to aid in the understanding of the invention, and variations may be made by one skilled in the art without departing from the spirit and scope of this invention.

EXAMPLE 1

The parallel mode bistable magnetic cores were made by the following procedure. A .030 inch outside diameter, .020 inch inside diameter, glass tube, 3 inches long, was thoroughly cleaned and dried. The tube was inserted into a standard vacuum evaporation chamber and coated on its external surface with a layer of chromium 50 to 100 angstrom units in thickness. Immediately following this deposition without breaking vacuum, a gold evaporation to the resistance value of 2.5 ohms per square, which is roughly 100 to 200 angstrom units, was applied to the surface of the chromium layer.

The cylindrical glass substrate with its conductive layer of gold on its external surface had its ends silvered closed and was placed in an electrolytic cell and made the cathode of the cell by connections to the conductive layer at each end of the tube. The electrolyte in the cell consisted of the following constituents in an aqueous solution:

| | | |
|---|---|---|
| Nickel chloride ($NiCl_2 \cdot 6H_2O$) | g./l. | 194 |
| Ferrous chloride ($FeCl_2 \cdot 4H_2O$) | g./l. | 7.85 |
| Sodium chloride (NaCl) | gm./l. | 9.7 |
| Boric acid ($H_3BO_3$) | gm./l. | 25 |
| Saccharin | gm./l. | 1 |
| Sodium lauryl sulfate | gm./l. | 0.42 |

An electrical conductor was strung, prior to the silvering step, through the cylindrical substrate and connected as in FIGURE 4 to a power supply 28 through switch 30. This magnetic orienting circuit was set to carry a current of 2.5 amperes. The 2.5 ampere current passing through the conductor generated a 13 oersted field about the conductor. The electrolyte temperature was maintained at $33.1 \pm 0.1°$ C. and a pH of $3.2 \pm 0.1$. A plating current of 26.5 milliamps per square inch was passed between the cathode and the anode for twenty minutes. For the first two minutes of the plating, the orienting field was left off. The orienting field was on for the remainder of the plating period. The resultant plating had a thickness of approximately 12,000 to 13,000 angstrom units with a composition of approximately 80% nickel and 20% iron.

The electroplated cylindrical article was encapsulating in a rosin (60%)-paraffin (40%) mixture which was then solidified. The embedded electroplated article was then cut along a plane perpendicular to its longitudinal axis a plurality of times with a diamond cutting wheel into 20 mil height sections. Each of these 20 mil sections is usable as a bistable closed flux magnetic core after removing the encapsulating plastic.

Figures 5A, 5B:
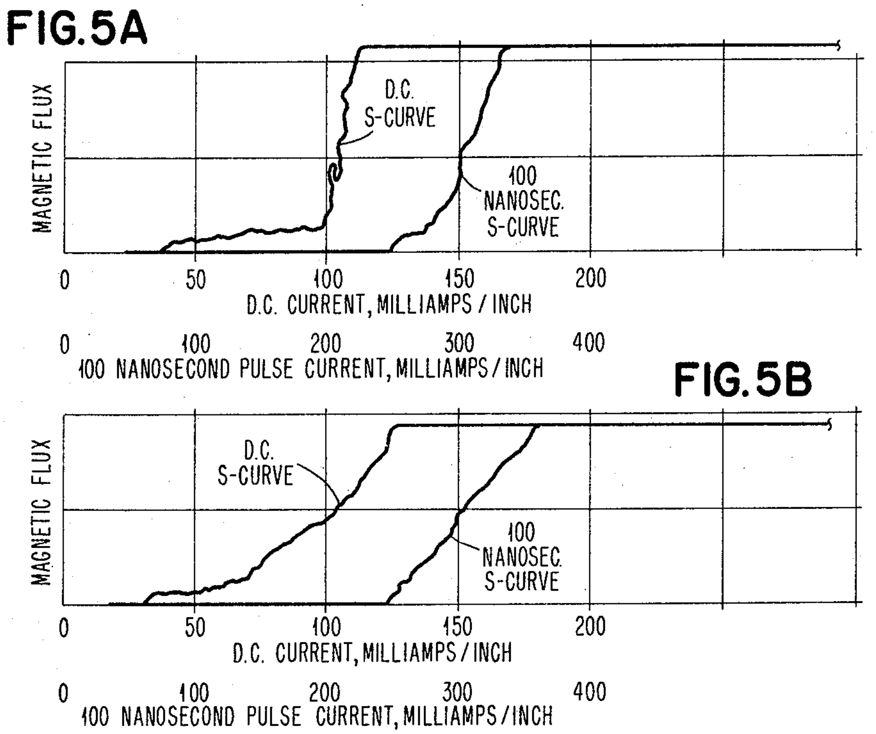
FIGURES 5A and 5B are "S-curves" for a metal bistable magnetic core according to one process of the invention useful in the fabrication of cores for parallel mode operation wherein the orienting field was on for 90% of the plating period.

Two complete "S-curves" were run on a typical bistable magnetic core produced by this example and are illustrated as FIGURES 5A and 5B. The "S-curves" were obtained by progressively increasing the current flow in a conductor strung through the center of the magnetic core and recording the resulting magnetic flux in lines of flux per inch. In each figure, the "S-curve" was obtained for what is termed the D.C. curve by passing a 60 cycle current through the conductor. The 100 nanosecond pulse curve was obtained by the passage of 100 nanosecond pulses through the conductor.

EXAMPLE 2

Figures 6A, 6B:
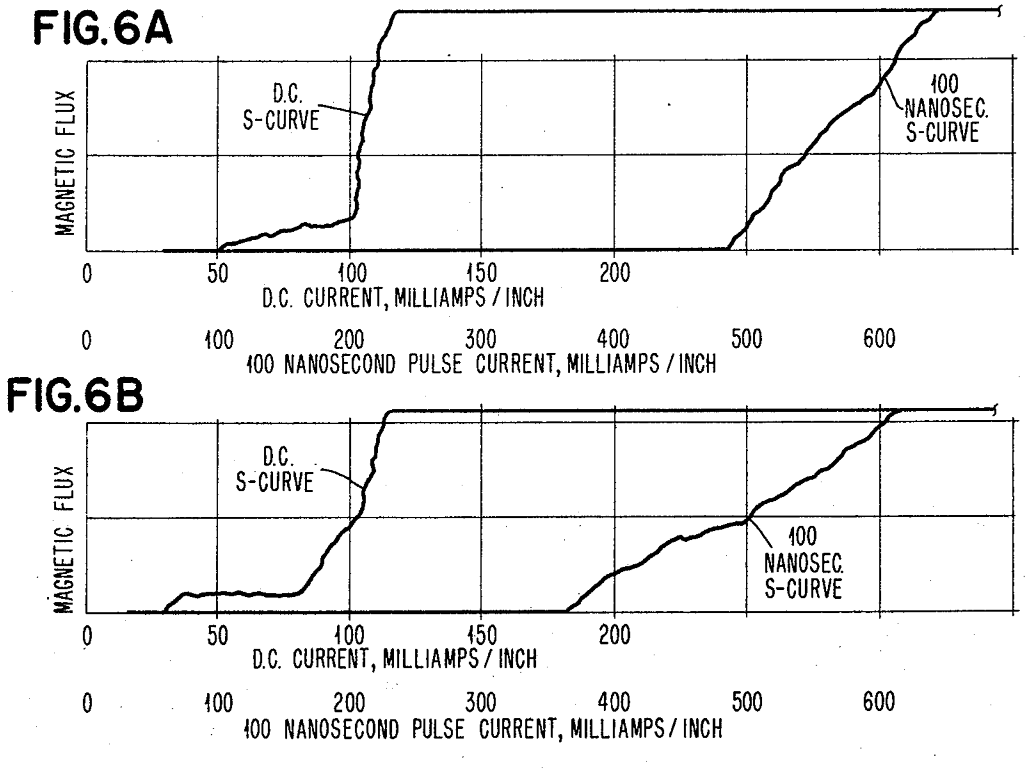
FIGURES 6A and 6B are "S-curves" for a metal bistable magnetic core produced with the orienting field on for 100% of the plating time.

The Example 1 was repeated with the exception that the orienting field was on at all times during electroplating time. The "S-curves" were run and illustrated as FIGURES 6A and 6B for a typical magnetic core produced by this example.

The resulting sets of curves given as FIGURES 5A and 5B and 6A and 6B can be visually compared. The D.C. "S-curves" are seen to remain constant in FIGURES 5 and 6. The 100 nanosecond curves of FIGURES 5A and 5B, however, are markedly faster in reaching their maximum magnetic flux value than the curves of FIGURES 6A and 6B. The switching period required for the magnetic cores produced by the novel process of the invention is therefore seen to be substantially reduced from that of the current applied during 100% of the electroplating period. This faster switching time of the magnetic cores, when operated in the parallel mode, may be attributed to the torque that is set up due to the postulated overall slightly skewed from the circumferential orientation of the ferromagnetic layer.

Figure 7:
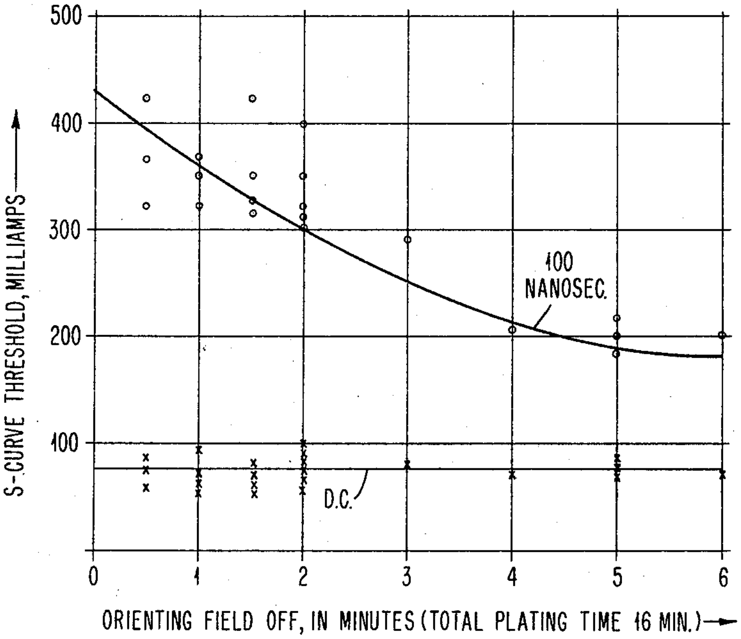
FIGURE 7 is a graphical representation giving 100 nanosecond pulse switching thresholds and D.C. thresholds versus various times which the orienting current was off during electroplating.

The FIGURE 7 curve correlates the orienting field off in time during the electroplating period versus 100 nanosecond switching threshold and D.C. threshold. The D.C. threshold remains constant throughout the testing. It can be seen, however, from the curve that the 100 nanosecond switching threshold magnitude is reduced by having the circumferential orienting field off during part of the plating period. When the thickness of the unoriented layer is increased in relation to the thickness of the oriented layer, the total magnetic core output is reduced. Further, the hysteresis loop of the magnetic device will tend to become constricted upon the increase in thickness of the unoriented layer. It has been found that the oriented-unoriented electroplated layer combination produced by having the orienting current on from 60 to 95% of the electroplating period gives the bistable magnetic cores of the best properties for use in the parallel mode operation. The switching constants of the thin film bistable cores of the present invention are 5 to 10 times faster than ferrite cores under the same field conditions.

EXAMPLE 3

The following procedure was used to make orthogonal mode bistable magnetic cores. The Example 3 procedure was identical to that of Example 1 except for some important exceptions. A substantially thicker gold layer of 1,000 angstrom units was condensed over the chromium layer by merely evaporating a greater amount of gold and condensing the gold onto the substrate in the vacuum evaporation unit. The electroplating period was reduced in milliamp minutes to half that for the parallel mode core and a deposit of 6,000 angstrom units was deposited upon the gold conductive layer. The circumferential orienting field was on during the entire electroplating time. The orthogonal mode bistable cores made fully met the specification listed above in the specification.

The invention thus provides a new bistable magnetic core and a process for making the core. The magnetic cores of the invention may alternately be used in conventional parallel mode switching circuits as an improved substitute for toroidal ferrite cores or in the newer orthogonal mode switching circuits. The tailoring of the magnetic cores to the mode in which each will be used as taught by this invention gives superior switching characteristics to the system in which they are utilized. The magnetic cores of the invention produce substantially lower switching constants than present day ferrite cores. However, the greatest advantage of the novel individual closed flux bistable magnetic cores of the invention is that they may be made cheaply in large quantities and with highly reliable and uniform properties. This manufacturing ability has, until the present invention, been unknown in the thin magnetic film core memory art.

While this invention has been particularly shown and described with reference to preferred embodiments thereof, it will be understood by those skilled in the art that the foregoing and other changes in form and details may be made therein without departing from the spirit and scope of the invention.

What is claimed is:

1. An individual closed flux bistable magnetic core having high speed switching characteristics comprising:
- a hollow cylindrical siliceous substrate less than approximately 100 mils in length;
- a layer of noble metal less than 5,000 angstrom units in thickness over the external surface of said substrate;
- a vacuum deposited adhesive metallic layer between said substrate and said noble metal layer;
- said adhesive metallic layer being a material selected from the group consisting of chromium, titanium and an alloy of nickel and chromium;
- and a nickel-iron alloy layer covering said noble metal layer having at least a substantially circumferentially magnetic orientation and being between 3,000 and 15,000 angstrom units in thickness.

2. An individual, high speed switching, closed flux bistable magnetic core for parallel mode operation comprising:
- a hollow cylindrical siliceous substrate less than approximately 100 mils in length;
- an evaporated layer of a noble metal of between 50 and 300 angstrom units in thickness over the external surface of said substrate;
- and a nickel-iron alloy layer covering said noble metal layer having a slightly skewed circumferentially magnetic orientation and being between 11,000 to 15,000 angstrom units in thickness.

3. An individual, high speed switching, closed flux bistable magnetic film for parallel mode operation comprising:

a right circular hollow cylindrical siliceous substrate having a perpendicular height of less than approximately 100 mils;

an evaporated layer of gold of between 50 and 300 angstrom units in thickness over the external surface of said substrate;

and a nickel-iron alloy electrodeposit covering said gold layer having a slightly skewed circumferentially magnetic orientation and being between 11,000 to 15,000 angstrom units in thickness.

4. An individual, high speed switching, closed flux bistable magnetic core for parallel mode operation comprising:

a right circular hollow cylindrical siliceous substrate having a perpendicular height of less than approximately 100 mils;

a layer of noble metal of between 50 and 300 angstrom units in thickness over the external surface of said substrate;

a vacuum deposited adhesive metallic layer between said substrate and said noble metal layer;

said adhesive metallic layer being a material selected from the group consisting of chromium, titanium and an alloy of nickel and chromium;

and a nickel-iron alloy layer covering said noble metal layer having a slightly skewed circumferentially magnetic orientation.

5. An individual, high speed switching, closed flux bistable magnetic core for parallel mode operation comprising:

a hollow cylindrical siliceous substrate less than approximately 100 mils in length;

a layer of gold metal of between 100 and 200 angstrom units in thickness over the external surface of said substrate;

a vacuum deposited adhesive metallic layer between said substrate and said gold metal layer;

said adhesive metallic layer being a material selected from the group consisting of chromium, titanium and an alloy of nickel and chromium;

and a nickel-iron alloy layer covering said gold metal layer having a slightly skewed circumferentially magnetic orientation and being between 11,000 to 15,000 angstrom units in thickness.

6. An individual, high speed switching, closed flux bistable magnetic core for orthogonal mode operation comprising:

a hollow cylindrical siliceous substrate less than approximately 100 mils in length;

a layer of noble metal between 100 to 2,000 angstrom units in thickness over the external surface of said substrate;

a vacuum deposited adhesive metallic layer between said substrate and said noble metal layer;

said adhesive metallic layer being a material selected from the group consisting of chromium, titanium and an alloy of nickel and chromium;

and a nickel-iron alloy layer covering said noble metal layer having a circumferentially magnetic orientation and being between 3,000 to 12,000 angstrom units in thickness.

7. An individual, high speed switching, closed flux bistable magnetic core for orthogonal mode operation comprising:

a right circular hollow cylindrical siliceous substrate having a perpendicular height of less than approximately 100 mils in length;

an evaporated layer of gold of between 500 to 1,500 angstrom units in thickness over the external surface of said substrate;

a vacuum deposited adhesive metallic layer between said substrate and said gold layer;

said adhesive metallic layer being a material selected from the group consisting of chromium, titanium and an alloy of nickel and chromium;

and a nickel-iron alloy electrodeposit covering said gold layer having a circumferentially magnetic orientation and being between 3,000 to 12,000 angstrom units in thickness.

8. An individual high speed switching closed flux bistable magnetic memory device having high speed switching characteristics comprising:

a thin substrate of siliceous material, a vacuum deposited adhesive metallic layer on said substrate, said adhesive metallic layer being of a material selected from the group consisting of chromium, titanium, and an alloy of nickel and chromium, a layer of noble metal less than 5,000 angstrom units in thickness overlying said adhesive metallic layer, and a nickel iron alloy layer overlying said layer of noble metal having at least a substantially peripheral magnetic orientation and being less than 15,000 angstrom units in thickness.

9. An individual high speed switching closed flux bistable magnetic memory device of orthogonal mode operation comprising:

a thin substrate of siliceous material, a vacuum deposited adhesive metallic layer on said substrate, said adhesive layer being of a material selected from the group consisting of chromium, titanium and an alloy of nickel and chromium, a layer of a noble metal between 100 to 2000 angstroms in thickness overlying said metallic adhesive layer, and a nickel-iron electrodeposited layer overlying said noble metal layer having a peripheral magnetic orientation and being less than 12,000 angstrom units in thickness.

References Cited by the Examiner

UNITED STATES PATENTS

| | | | |
|---|---|---|---|
| 2,910,748 | 10/1959 | Bloch | 340—174 |
| 2,934,748 | 4/1960 | Steimen | 340—174 |
| 2,985,948 | 5/1961 | Peters | 29—155.5 |
| 3,068,554 | 12/1962 | Pouget | 29—155.5 |
| 3,183,492 | 5/1965 | Chow | 340—174 |
| 3,197,749 | 7/1965 | Clinehens | 340—174 |

OTHER REFERENCES

Pages 45S–46S, April 1959, "Millimicro-second Magnetic Switching and Storage Element" by D. A. Meier, Journal of Applied Physics, supp. to vol. 30, #4.

JAMES W. MOFFITT, *Acting Primary Examiner.*

IRVING L. SRAGOW, *Examiner.*

R. J. McCLOSKEY, M. S. GITTES, *Assistant Examiners.*